US006799107B2

(12) United States Patent
Mushiake et al.

(10) Patent No.: US 6,799,107 B2
(45) Date of Patent: Sep. 28, 2004

(54) DOOR LOCK DEVICE AND CONTROL METHOD THEREOF

(75) Inventors: Eiji Mushiake, Aichi-ken (JP); Kiyokazu Ieda, Chiryu (JP); Yuichi Murakami, Chiryu (JP); Shigeru Hayakawa, Chiryu (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 0 days.

(21) Appl. No.: 10/349,976

(22) Filed: Jan. 24, 2003

(65) Prior Publication Data

US 2003/0171864 A1 Sep. 11, 2003

(30) Foreign Application Priority Data

Jan. 24, 2002 (JP) ....................................... 2002-016204

(51) Int. Cl.[7] ........................... B60R 25/00; E05C 3/06; E05B 53/00

(52) U.S. Cl. .............................. 701/49; 701/29; 70/257

(58) Field of Search ........................ 701/49, 29; 70/257, 70/264, 277, 280, 263; 292/201, DIG. 23; 307/10.2, 10.4; 180/287

(56) References Cited

U.S. PATENT DOCUMENTS 4,425,597 A * 1/1984 Schramm .................... 361/172
4,978,154 A 12/1990 Kleefeldt et al. ........... 292/201
5,603,537 A * 2/1997 Amano et al. .............. 292/201
5,965,953 A * 10/1999 Ikeda et al. ................ 307/10.2
6,175,795 B1 * 1/2001 Sumida ........................ 701/49
6,441,512 B1 * 8/2002 Jakel et al. ................ 307/10.2
6,519,987 B1 * 2/2003 Weyerstall ................... 70/257

FOREIGN PATENT DOCUMENTS

DE 39 02 873 A1 2/1990

* cited by examiner

*Primary Examiner*—Tan Q. Nguyen
*Assistant Examiner*—Dalena Tran
(74) *Attorney, Agent, or Firm*—Burns, Doane, Swecker & Mathis, L.L.P.

(57) ABSTRACT

A control method for a door lock device performs an unlocking operation of a lock mechanism of a vehicle door by energizing and actuating an actuator in response to an unlocking command from a vehicle user. The method has: a first time period (T1) for energizing the actuator in accordance with the unlocking command by the user; a second time period (T2) for returning an operation portion provided on a vehicle from an operated position to a normal position; and a third time period (T3) during which the actuator starts the unlocking operation and complete the unlocking of the lock mechanism. The first time period is determined to be equal to or longer than a sum of the second time period and the third time period.

18 Claims, 3 Drawing Sheets

DOOR LOCK DEVICE AND CONTROL METHOD THEREOF

This application is based on and claims priority under 35 U.S.C. § 119 with respect to Japanese Patent Application No. 2002-016204 filed on Jan. 24, 2002, the entire content of which is incorporated herein by reference.

FIELD OF THE INVENTION

The present invention relates to a door lock device and a method of controlling a door lock. An illustrative embodiment of the present invention relates to a door lock device and a method of controlling a door lock which automatically unlocks a vehicle door in response to an unlock indication provided by a user.

BACKGROUND OF THE INVENTION

With a known door lock device, the door lock device fails to unlock a vehicle door under a condition that an outside handle is pulled or otherwise operated. Thus, with the known door lock device, it is required to perform the unlocking operation again after a user returns the outside handle to a normal position. Thus causes inconvenience to the users.

Recently, door lock devices have been introduced which respond to a signal transmitted by a transceiver of a user, as the user approaches the vehicle. Such devices are termed “smart entry devices”. Such a door lock device includes, a sensor which detects that the hand of a user contacts an outside handle, to operate an actuator for unlocking a lock mechanism. The lock mechanism, and the actuator, may not be ready for the unlocking operation if the user suddenly pulls the outside handle simultaneous with contacting the outside handle. In this case, the door lock device fails to automatically unlock and the user cannot open the door even when pulling the outside handle. That is, in this case, it is required to perform the unlocking operation again after returning the outside handle to the normal position and thus causes inconvenience to the users.

With other known door lock devices other than the above mentioned smart entry door lock devices, the same drawback may be generated when the vehicle has at least one potential occupant additional to the operator of the lock device. That is, if the potential occupant pulls the outside handle of any one of doors immediately before the operator performs the unlocking operation, the, door whose outside door handle is pulled is not unlocked. In this case, it is required that the operator performs the unlocking operation again after the other potential occupant returns the outside handle to its normal position, causing inconvenience to the users.

A known door lock device disclosed in German Patent Laid-Open Publication No. DE3902873A1 obviates the aforementioned drawbacks. The known door lock device disclosed in German Patent Laid-Open Publication No. DE3902873A1 includes a mechanical mechanism which allows the unlocking of the door lock mechanism even when the unlocking operation is performed under the condition that the outside door handle of the vehicle door is pulled.

With the known door lock device disclosed in German Patent Laid-Open Publication No. DE3902873A1, the number of parts of the door lock device as a whole is increased by adding the mechanism for allowing the unlocking of the door lock mechanism under the condition that the outside door is pulled. This causes a drawback that the size of the door lock device per se is increased and the manufacturing cost of the door lock is increased.

SUMMARY OF THE INVENTION

One aspect of the present invention provides a control method for a door lock device for performing an unlocking operation of a lock mechanism of a vehicle door by energizing and actuating an actuator in response to an unlocking command from a vehicle user which includes a first time period for energizing the actuator in accordance with the unlocking command by the user, a second time period for returning an operation portion provided on a vehicle from an operated position to a normal position, and a third time period during which the actuator starts the unlocking operation and completes the unlocking of the lock mechanism. The first time period is determined to be equal to or longer than a sum of the second time period and the third time period.

Another aspect of the present invention, provides a door lock device for performing an unlocking operation of a lock mechanism of a vehicle door by energizing and actuating an actuator in response to an unlocking command from a vehicle user which is operating in according with a first time period for energizing the actuator in response to the unlocking command by the user, the first time period being equal to or longer than a sum of a second time period which is the time that an operation portion provided on a vehicle is returned from an operated position to a normal position and a third time period which is the elapsing for a time that during which the actuator starts the unlocking the operation and completes the unlocking of the lock mechanism.

An illustrative embodiment of the invention seeks to provide a door lock device and a method of controlling a door lock device which performs an automatic unlocking operation even when an unlocking operation is performed under a condition that an outside handle of a vehicle door is pulled.

BRIEF DESCRIPTION OF THE DRAWING FIGURES

A better understanding of the present invention will become more apparent from the following illustrative description considered with reference to the accompanying drawing figures in which like reference numerals designate like elements.

DETAILED DESCRIPTION OF THE INVENTION

A door lock device and a control method of the door lock device according to an embodiment of the present invention will be explained referring to FIGS. 1–3.

Figure 1:
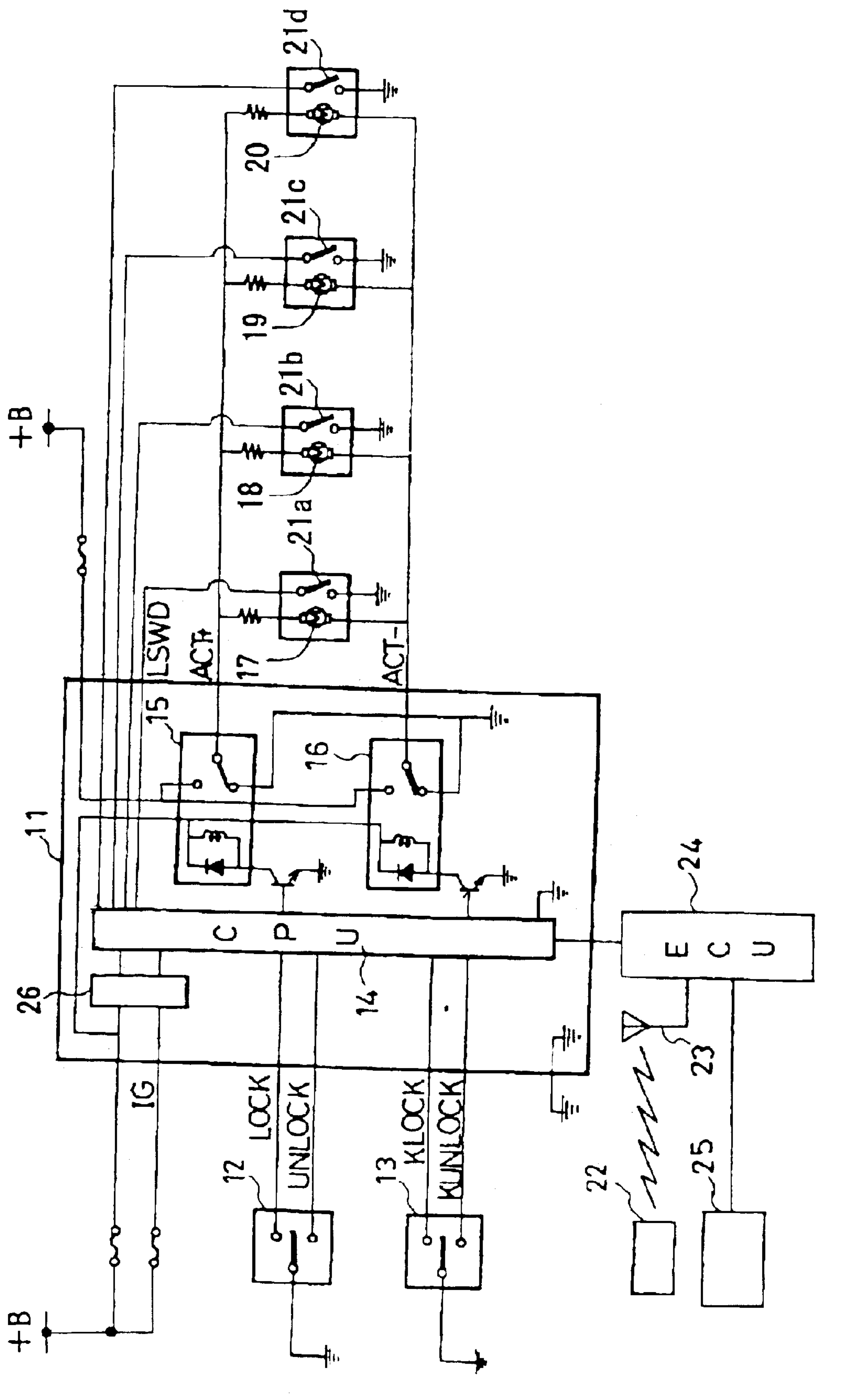
FIG. 1 is a systematic view showing an overview of a door lock device according to an embodiment of the present invention.

As shown in FIG. 1, a main construction of the door lock device will be explained as follows. A door control unit 11 is electrically connected to a master switch 12 for the central locking. The switch 12 may be provided on the door inside the vehicle compartment and arranged to be operated by a vehicle user (e.g., operator). The door control unit 11 is also electrically connected to a key cooperation switch 13 cooperating with the rotation of a master key inserted into a key cylinder of a door. An electric voltage signal for commanding locking or unlocking of the door lock in accordance with the operation of the user is inputted into the door control unit 11 by the switches 12 or 13. The electric voltage signal for commanding the unlocking from the master switch 12 or from the key cooperation switch 13 is input to a central processing unit CPU 14 in the door control unit 11. The CPU 14 is supplied with the power from a power source circuit 26.

A transceiver 22 (shown in FIG. 1) is carried by the vehicle user as an accessory item of the master key. The transceiver 22 transmits to the vehicle a signal with a predetermined frequency when receiving a signal transmitted from an antenna (not shown) of the vehicle. The signal transmitted to the vehicle includes information such as an identification code. When the user of the transceiver 22 approaches the vehicle, the signal including the information such as the identification code from the transceiver 22 is received by an antenna 23, which inputs a corresponding electric voltage signal to a control unit ECU 24 in the vehicle.

A capacitance sensor 25 is provided on the back of an outside handle (i.e., serving as an operation portion) which has a contact with a hand of the user of the transceiver 22. When the user touches the capacitance sensor 25, the capacitance of the capacitance sensor 25 is varied and the capacitance sensor 25 outputs an electric voltage signal as a result of detecting the contact of the hand of the user to the capacitance sensor 25. The capacitance sensor 25 is electrically connected to the control unit ECU 24 and the control unit ECU 24 detects that the user contacts the outside handle.

The control unit ECU 24 is electrically connected to the CPU 14 in the door control unit 11. When the electric voltage signal indicating the approach of the user of the transceiver 22 is input from the antenna 23, a preparation state to be ready for commanding the door control unit ECU 11 to unlock the door lock is established.

When the detection result that the user of the transceiver 22 contacts the outside handle is input from the capacitance sensor 25, the control unit ECU 24 commands the door control unit 11 to unlock the door lock following a predetermined program. That is, the electric voltage signal for commanding the unlocking of the door lock is transmitted from the control unit ECU 24 to the CPU 14.

If an unlock button (not shown) of the transceiver 22 is pressed, the signal for commanding the unlocking of the door lock is transmitted. Then, the control unit ECU 24 transmits an electric voltage signal for commanding the unlocking of the door lock to the CPU 14 in the door control unit 11.

Upon receiving an electric voltage signal for commanding the unlocking of the door lock from the master switch 12, or the key cooperation switch 13, or the control unit ECU 24, the CPU 14 outputs an output electric voltage signal V1 (shown in FIG. 2) for achieving the OFF state of a door lock relay 15 and the ON state of a door unlock relay 16. When the door unlock relay 16 achieves the ON state and the door lock relay 15 achieves the OFF state a motor 17 for actuating a door lock mechanism at a driver's seat side door, a motor 18 for actuating a door lock mechanism at a front passenger seat side door, a motor 19 for actuating a door lock mechanism at a rear right passenger seat side door, and a motor 20 for actuating a door lock mechanism at a rear left passenger seat side door for actuating the door lock mechanism are energized in a direction to actuate the respective door lock mechanisms to be unlocked.

According to the door lock device of the embodiment, door lock position switches 21*a*, 21*b*, 21*c*, 21*d*, are provided on the respective door lock mechanisms of the doors of the vehicle. When the door lock mechanisms are locked, the door lock position switches 21*a*, 21*b*, 21*c*, 21*d* are ON. When the door lock mechanism is unlocked, the corresponding door lock position switches 21*a*, 21*b*, 21*c*, 21*d* are OFF. As shown in FIG. 2, each of the door lock position switches 21*a*, 21*b*, 21*c*, 21*d* input an electric voltage signal V2 showing the locked state of the door lock mechanism to the CPU 14 of the door control unit ECU 11.

The CPU 14 controls an output time of the output electric voltage signal V1 for achieving the OFF state of the door lock relay 15 and the ON state of the door unlock relay 16 considering the timing of the outside handle being pulled and the timing of the locked and unlocked states of the lock position switches 21*a*, 21*b*, 21*c*, 21*d*.

The operation of the door lock device of the embodiment will be explained with reference to FIGS. 2–3 as follows.

Figure 2:
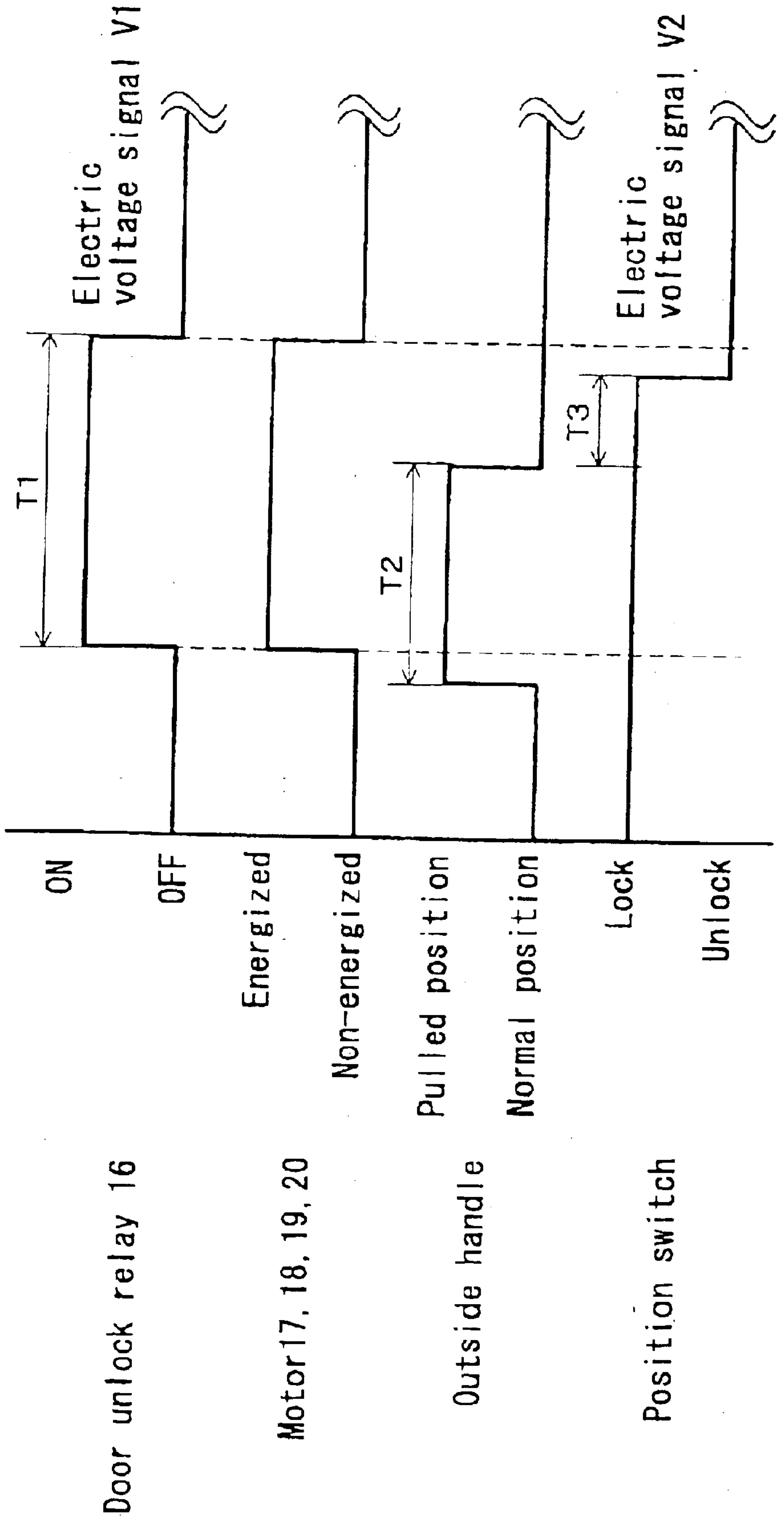
FIG. 2 is a timing chart showing a time series relationship among ON-OFF of a door unlock relay, an energization state of motors for actuating a door lock mechanism, an operation state of an outside handle provided on a door, and ON-OFF of a door lock position switch under a lock-unlocking operation of the door lock device according to the embodiment of the present invention.

FIG. 2 shows the relationship between the timing of the ON-OFF states of the door unlock relay 16, the energization state of the motors 17, 18, 19, 20 for actuating the door lock mechanism at the door, the operation state of the outside handle provided on the door, and the ON-OFF state of the door lock position switches 21*a*, 21*b*, 21*c*, 21*d* at the door under the unlocking operation of the door lock device.

As shown in FIG. 2, when the electric voltage signal for commanding the unlocking by the master switch 12 or the key cooperation switch 13, in response to the operation by the user of the transceiver 22, is input into an input terminal of the CPU 14 in the door control unit 11, the CPU 14 outputs the output signal V1 for achieving the ON state of the door unlock relay 16 and the OFF state of the door lock relay 15. The motors 17, 18, 19, 20 are in the energization state during a period of time T1 (i.e., a first time period) that the output signal V1 is ON.

Referring to FIG. 2, consider the case, for example, that another passenger (other than the user of the transceiver 22) is trying to enter the vehicle and pulls the outside handle of any one of the front passenger seat side door, the rear right passenger seat side door, or the rear left passenger seat side door before the user of the transceiver 22 performs the unlocking operation of the door lock device of the vehicle and then notices that the door is not unlocked and then releases the outside handle. A period of time T2 (i.e., a second time period) is required for returning the outside door handle from the pulled position to the normal position. As shown by way of example in FIG. 2, the outside handle is pulled at a timing before starting the energization of the motors 17, 18, 19, 20.

Assume it takes a period of time T3 (i.e. a third time period) from starting the actuation by energizing the motors 17, 18, 19, 20 to achieve the unlocked state of the door lock mechanism (i.e., the door lock mechanism is operated from the locked state to the unlocked state), as shown in FIG. 2 By determining the period T1 to be equal to or greater than the sum of the period T2 and the period T3, the motors 17, 18, 19, 20 can unlock the door lock mechanism within the time T1. Thus, the aforementioned another passenger can open the door by re-pulling the outside handle after once releasing the outside handle.

Figure 3:
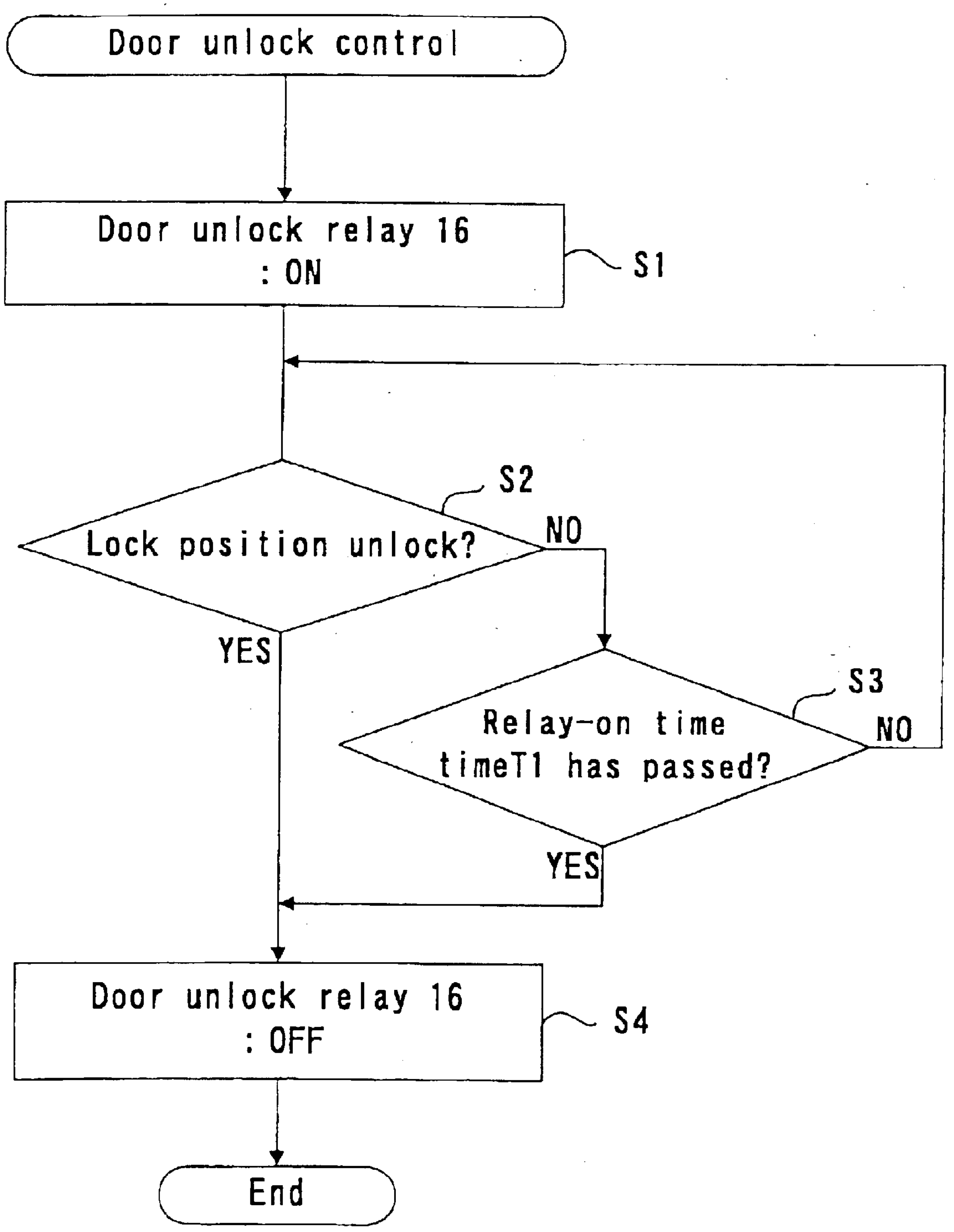
FIG. 3 is a flowchart showing a overview of the algorithm of a program calculated by a CPU included in a door ECU of a door lock device according to the embodiment of the present invention.

The CPU 14 performs the calculation transaction following the predetermined program having an algorithm shown in FIG. 3 and outputs the output electric voltage signal for switching the door unlock relay 16 to be ON and the door unlock relay to be OFF.

In Step S1, the CPU 14 performs a transaction for outputting the output signal V1 for achieving the ON state of the door unlock relay 16 and the corresponding OFF state of the door lock relay 15. The CPU 14 memorizes an elapsed time for the transaction in a memory device (not shown) at a point when starting the transaction of Step S1. That is the CPU 14 starts a clock for timing the time T1 when starting Step S1.

In Step S2, the CPU 14 judges whether the electric voltage signal V2 from the door lock position switches 21*a*, 21*b*, 21*c*, 21*d* shows the locked state or the unlocked state. When the all door lock position switches 21*a*, 21*b*, 21*c*, 21*d*, are determined to be in the unlocked state, the transaction advances to Step S4. When at least one of the door lock position switches 21*a*, 21*b*, 21*c*, 21*d* is in the locked state, the transaction advances to Step S3.

In Step S2, when the electric voltage signal V2 shows the locked state, the transaction is forwarded to Step S3. In Step S3, it is judged whether the time that the door unlock relay 16 is ON after starting the transaction of Step S1 exceeds the time T1. If the time that the door unlock relay 16 is ON after starting the transaction of Step S1 exceeds the time T1, the transaction is forwarded to Step S4, then the door unlock relay 16 becomes OFF for completing the transaction. That is, in this case, the CPU 14 performs the transaction for maintaining the door unlock relay 16 to be ON for the time T1 which corresponds to a longest time.

On the other hand, if the time that the door unlock relay 16 is ON after starting the transaction of Step S3 does not exceed the time T1, the transaction is returned to Step S2. Based on the electric voltage signal V2 from the door lock position switches 21*a*, 21*b*, 21*c*, 21*d*, if the door lock mechanism is in the unlocked state, the unlock relay 16 is set to OFF even if the time T1 has not elapsed to stop the energization to the motors 17–20.

In case that none of the outside handles of the vehicle doors is pulled, then the door unlock relay 16 becomes ON and the door lock mechanism assumes the unlocked state under the judgment in Steps S2 and S3, and the energization of the motors 17–20 can be completed within a period of time equal to T3 which corresponds to a shortest time. Thus, the energy consumption of the door lock device can be reduced.

Although the outside handle is applied as the operation portion of the vehicle door, the operation portion includes other configuration such as a push button and a rotational lever. The door lock device and the control method thereof according to the present invention may be applied to other vehicle doors including other types of the operation portions.

According to the embodiment of the present invention, the door lock device and the control method thereof which can automatically performs the unlocking operation even when performing the unlocking operation under the state that the outside handle of the vehicle door is pulled by the improvement of the control method for controlling the door lock mechanism.

With the control method of the door lock according to the embodiment of the present invention, the actuator for actuating the door lock mechanism of the vehicle is energized by performing the unlocking operation of the vehicle by the user. The unlocking operation includes any one of: pressing the unlock switch of the central door lock; rotational operation of a key cylinder; transmitting a command signal for unlocking by wireless transmission; and transmitting the command signal for unlocking by wireless transmission together with the user contacting the outside handle.

The maximum time for energizing the actuator is determined to be the first time period T1. The operation portion provided on the outside of the vehicle is moved from the normal position to the operated position by the user. For example, the operation portion includes the outside handle of the door and the operated position corresponds to a position pulled by a predetermined distance or predetermined angle by the user. When the user releases the operation portion, the operation portion is returned to the normal position by a biasing means such as a return spring. The time period for returning the operation portion from the operated position to the normal position is determined to be the second time period T2. The minimum time required for energizing the actuator, actuating the lock mechanism, and performing the unlocked state of the lock mechanism from the locked state is determined to be the third time period T3. With the control method of the door lock device of the embodiment of the present invention, the first time period T1 is determined to be equal to or longer than the sum of the second time period T2 and the third time period T3. It is further preferable that the time required for returning the operation portion from a fully moved position to the normal position by the biasing means is determined to be the second time.

The control method for the door lock device of the embodiment of the present invention operates as follows. When the user or the passenger moves the operation portion before performing the unlocking operation of the door lock, for example, when the outside handle is pulled before performing the unlocking operation of the door lock, the lock mechanism does not perform the unlocking operation. Then, when the user releases the operation portion, the operation portion is returned to the normal position within the second time period T2. Under the state that the operation portion is returned to the normal position, the unlocking operation of the lock mechanism is performable. Thus, the lock mechanism is actuated again by the actuator continued to be operated during the first time period T1 and the door lock is unlocked within the third time period T3. Because the first time period T1 is determined to be equal to or longer than the sum of the second time period T2 and the third time period T3, the lock mechanism automatically performs the unlocking operation when the passenger releases the pulled outside handle.

As explained above, with the control method of the door lock device of the embodiment of the present invention, it is not necessary to perform the unlocking performance twice even when the user or the passenger pulls the outside handle before performing the unlocking operation of the vehicle door. Thus, inconvenience to by the users can be reduced.

With the construction of the door lock device and the control method of the door lock device according to the embodiment of the present invention, in case the outside handle is not pulled before performing the unlocking operation of the door lock device of the vehicle door by the vehicle user, the lock mechanism achieves the unlocked state within the third time period T3. Thus, it is not necessary to energize the actuator for the whole of the first time period T1. Thus, the control for detecting whether the lock mechanism is unlocked after elapse of the third time period T3 after commanding the unlocking operation by the user and for stopping the energization of the actuator is performed before elapsing of the first time period T1 if the lock mechanism is in the unlocked state before the end of the first time period T1'. Thus, the power consumption necessary for the door lock can be reduced.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention be embraced thereby.

What is claimed is:

1. A control method for a door lock device for performing an unlocking operation of a lock mechanism of a vehicle door by energizing and actuating an actuator in response to an unlocking command from a vehicle user comprising:

a first time period for energizing the actuator in accordance with the unlocking command by the user;

a second time period for returning an operation portion provided on a vehicle from an operated position to a normal position; and a third time period during which the actuator starts the unlocking operation and completes the unlocking of the lock mechanism; wherein the first time period is determined to be equal to or longer than a sum of the second time period and the third time period.

2. A control method for a door lock device according to claim 1, wherein the energization to the actuator is stopped when an unlocked state of the lock mechanism is detected before the elapsing of the first time period.

3. A control method for a door lock device according to claim 2, wherein the energization to the actuator is stopped within the third time period when the operation portion is not operated before performing the unlocking operation of the door lock device.

4. A control method for a door lock device according to claim 3, wherein the operation portion includes a door handle provided on an outside of the vehicle.

5. A control method for a door lock device according to claim 3, further comprising, a sensor provided on the operation portion for sensing the unlocking operation by the user.

6. A control method for a door lock device according to claim 5, wherein the sensor is a capacitive sensor.

7. A control method for a door lock device according to claim 1, further comprising a position switch for indicating the status of the lock; wherein the third time period is determined based on the state of the position switch by being in one state in a locked state of the door lock mechanism and being in a second state in an unlocked state of the door lock mechanism.

8. A control method for a door lock device according to claim 1, wherein the operated position of the operation portion is determined by an action of the user and the operation portion is returned from the operated position to the normal position via a biasing means.

9. A control method for a door lock device according to claim 8, wherein the biasing means includes a spring.

10. A door lock device for performing an unlocking operation of a lock mechanism of a vehicle door by energizing and actuating an actuator in response to an unlocking command from a vehicle user, the device operating in according with a first time period for energizing the actuator in response to the unlocking command by the user, the first time period being equal to or longer than a sum of a second time period which is the time that an operation portion provided on a vehicle is returned from an operated position to a normal position and a third time period which is the elapsing for a time that during which the actuator starts the unlocking the operation and completes the unlocking of the lock mechanism.

11. A door lock device according to claim 10, further comprising a detection means for detecting the state of the lock mechanism; wherein the energization to the actuator is stopped when the unlocked state of the lock mechanism is detected by the detection means before the elapsing of the first time period.

12. A door lock device according to claim 11, wherein the detection means includes a position switch for indicating the status of the lock mechanism; wherein the third time period is determined based on a state of the position switch by being in one state under a locked state of the lock mechanism and being in a second state under an unlocked state of the deer lock mechanism.

13. A door lock device according to claim 10, wherein the energization of the actuator is stopped within the third time period when the operation portion is not operated before performing the unlocking operation of the door lock device.

14. A door lock device according to claim 10, wherein the operated position of the operation portion is determined by an action of the user and the operation portion is returned to the normal position via a biasing means.

15. A door lock device according to claim 14, wherein the biasing means includes a spring.

16. A door lock device according to claim 10, wherein the operation portion includes a door handle.

17. A door lock device according to claims 10, further comprising a sensor provided on the operation portion for sensing the unlocking operation by the user.

18. A door lock device according to claim 17, wherein the sensor is a capacitive sensor.

* * * * *